US012676046B2

(12) United States Patent
Zhang

(10) Patent No.: US 12,676,046 B2
(45) Date of Patent: Jul. 7, 2026

(54) DEVICE FOR STORING AND RETRIEVING MEALS AND AUTOMATIC MEALS VENDING MACHINE

(71) Applicant: SHENZHEN CHAOYONG TIMES TECHNOLOGY CO., LTD., Shenzhen (CN)

(72) Inventor: Hengjie Zhang, Shenzhen (CN)

(73) Assignee: SHENZHEN CHAOYONG TIMES TECHNOLOGY CO., LTD., Shenzhen (CN)

( * ) Notice: Subject to any disclaimer, the term of this patent is extended or adjusted under 35 U.S.C. 154(b) by 241 days.

(21) Appl. No.: 18/602,806

(22) Filed: Mar. 12, 2024

(65) Prior Publication Data

US 2024/0257599 A1 Aug. 1, 2024

Related U.S. Application Data

(63) Continuation of application No. PCT/CN2022/113113, filed on Aug. 17, 2022.

(30) Foreign Application Priority Data

Oct. 15, 2021 (CN) ......................... 202111207154.4

(51) Int. Cl.
*G07F 11/10* (2006.01)

(52) U.S. Cl.
CPC .................................... *G07F 11/10* (2013.01)

(58) Field of Classification Search
CPC ....................................................... G07F 11/10
See application file for complete search history.

(56) References Cited

U.S. PATENT DOCUMENTS 5,168,795 A * 12/1992 Okada ................. G07F 17/0078 99/336
5,503,300 A * 4/1996 Prescott .................. G07F 9/026 221/175

(Continued)

FOREIGN PATENT DOCUMENTS

CN 205507989 U 8/2016
CN 205541119 U 8/2016

(Continued)

OTHER PUBLICATIONS

International Search Report and Written Opinion issued in corresponding PCT Application No. PCT/CN2022/113113, dated Oct. 31, 2022.

(Continued)

*Primary Examiner* — Gene O Crawford
*Assistant Examiner* — Ayodeji T Ojofeitimi
(74) *Attorney, Agent, or Firm* — Westbridge IP LLC

(57) ABSTRACT

Disclosed are a device for storing and retrieving meals and an automatic meals vending machine. The device for storing and retrieving meals includes a meals storage shelf and a meals pickup assembly. A middle part of the meals storage shelf is provided with a meals pickup passage. The meals storage shelf is provided with a plurality of storage spaces evenly distributed along a circumferential direction and an axial direction. The plurality of storage spaces are provided at a periphery of the meals storage shelf, and the meals pickup passage is communicated with the storage spaces. The meals pickup assembly includes a meals storage piece provided in and vertically movable relative to the meals pickup passage and a meals pushing piece provided at a side of the storage spaces away from the meals pickup passage and telescopic relative to the meals storage shelf to push meals.

7 Claims, 7 Drawing Sheets

(56) References Cited

U.S. PATENT DOCUMENTS

| | | | | |
|---|---|---|---|---|
| 5,799,822 | A * | 9/1998 | Rudewicz | H05B 6/808 219/678 |
| 7,137,529 | B2 * | 11/2006 | Martinelli | G07F 11/54 221/150 R |
| 2006/0196883 | A1 * | 9/2006 | Ward | G07F 9/105 221/2 |
| 2014/0224826 | A1 * | 8/2014 | Otzen | G07F 11/10 221/1 |

FOREIGN PATENT DOCUMENTS

| | | | |
|---|---|---|---|
| CN | 205621142 | U | 10/2016 |
| CN | 206224696 | U | 6/2017 |
| CN | 107067552 | A | 8/2017 |
| CN | 206515984 | U | 9/2017 |
| CN | 107369260 | A | 11/2017 |
| CN | 207044182 | U | 2/2018 |
| CN | 208463626 | U | 2/2019 |
| CN | 210574047 | U | 5/2020 |
| CN | 212939129 | U | 4/2021 |
| CN | 213706694 | U | 7/2021 |
| CN | 113920651 | A | 1/2022 |
| CN | 113942693 | A | 1/2022 |
| CN | 113963483 | A | 1/2022 |
| CN | 210488666 | U | 5/2022 |
| CN | 220305853 | U | 1/2024 |
| TW | I738377 | B | 9/2021 |

OTHER PUBLICATIONS

First Office Action issued in counterpart Chinese Patent Application No. 202111207154.4, dated May 27, 2025.

Second Office Action issued in counterpart Chinese Patent Application No. 202111207154.4, dated Aug. 20, 2025.

* cited by examiner

DEVICE FOR STORING AND RETRIEVING MEALS AND AUTOMATIC MEALS VENDING MACHINE

CROSS-REFERENCE TO RELATED APPLICATIONS

This application is a continuation application of International Application No. PCT/CN2022/113113, filed on Aug. 17, 2022, which claims priority to Chinese Patent Application No. 202111207154.4, filed on Oct. 15, 2021. The disclosures of the above-mentioned applications are incorporated herein by reference in their entireties.

TECHNICAL FIELD

The present application relates to the technical field of vending machines, and in particular, to a device for storing and retrieving meals and an automatic meals vending machine.

BACKGROUND

Because most of the production processes of traditional flavored snacks and meals are cumbersome and complicated, it is difficult to carry out large-scale, standardized processing and sales. With the development of the times, labor costs and store rental costs are getting higher and higher, and many traditional flavored snacks and meals have become increasingly rare. For example, it is reported that many old gourmet restaurants in Hong Kong that have been operating for many years have closed due to high costs. In today's fast-paced lifestyle, automatic food vending equipment is favored by people, but all the automatic vending food belongs to boxed fast food, and traditional flavored snacks and meals (such as Chinese hamburger, Chinese rolled dough, etc.) are rarely introduced into automatic food vending equipment. Moreover, the structural design of the automatic food vending equipment is unreasonable, so it takes up a lot of space but has a small food storage capacity.

SUMMARY

The main purpose of the present application is to provides a device for storing and retrieving meals, which aims to obtain a device for storing and retrieving meals that increases the amount of food stored and occupies a small space, so as to save the space of the automatic meals vending machine.

In order to achieve the above purpose, the present application provides a device for storing and retrieving meals, including:

- a meals storage shelf; a middle part of the meals storage shelf being provided with a meals pickup passage, the meals storage shelf being provided with a plurality of storage spaces evenly distributed along a circumferential direction and an axial direction, the plurality of storage spaces being provided at a periphery of the meals storage shelf, and the meals pickup passage being communicated with the storage spaces; and
- a meals pickup assembly including a meals storage piece and a meals pushing piece; the meals storage piece being provided in and vertically movable relative to the meals pickup passage, the meals pushing piece being provided at a side of the storage spaces away from the meals pickup passage and being telescopic relative to the meals storage shelf to push meals in a corresponding storage space to the meals storage piece.

In some embodiments, the meals pickup assembly further includes a first actuator and two screw rods provided vertically and in parallel; the first actuator is fixedly provided relative to the meals storage shelf and is configured to drive the two screw rods to rotate synchronously; and the meals storage piece is connected to the two screw rods and is located between the two screw rods to be vertically movable relative to the meals pickup passage.

In some embodiments, the meals pickup assembly further includes a second actuator and the second actuator is vertically movable relative to the meals storage shelf; a driving shaft of the second actuator is connected to the meals pushing piece to make the meals pushing piece telescopic; and/or

- the meals pushing piece is movably provided in a vertical direction; and/or
- a surface of the meals pushing piece facing the meals storage shelf is a curved surface.

In some embodiments, the meals storage shelf includes a support bar and at least two storage trays; the storage trays are provided at intervals in a vertical direction and connected to the support bar; and two adjacent storage trays and the support bar are enclosed to form the storage space.

In some embodiments, each storage tray is provided with a meals pickup hole in a center and a plurality of meals pickup holes in series form the meals pickup passage; a plurality of support bars are provided at a periphery of the storage trays at intervals and configured to extend towards a center of the storage trays; and two adjacent support bars and two adjacent storage trays are enclosed to form the storage space.

In some embodiments, the meals pickup assembly includes a puncher fixed above the meals storage piece; and the puncher is provided with a needle towards a surface of the meals storage piece to punch a hole on a packaging box in the meals storage piece.

The present application further provides an automatic meals vending machine including:

- a machine shell provided with an accommodation space and a meals outlet communicated to the accommodation space;
- a device for storing and retrieving meals of claim 1 provided inside the accommodation space; and
- an electronic control assembly provided in the accommodation space and electrically connected to the device for storing and retrieving meals to control the device for storing and retrieving meals to take out meals and deliver the meals to the meals outlet.

In some embodiments, the meals storage shelf is rotatably provided relative to the machine shell; and/or

- a plurality of devices for storing and retrieving meals are provided side by side in the accommodation space at intervals.

In some embodiments, the automatic meals vending machine further includes a heating assembly; the meals pickup assembly is movable between the meals storage shelf and the heating assembly to take out meals in the storage space, send the meals to the heating assembly for heating, and delivery the meals to the meals outlet.

In some embodiments, the machine shell includes an outer shell and at least two partition plates; the outer shell is configured to form the accommodation space, and the partition plates are connected to an inner wall of the accommodation space to divide the accommodation space into a heating zone, a cold storage zone, an electronic control zone from top to bottom; the heating assembly is provided in the heating zone, the meals storage shelf is provided in the cold storage zone, and the electronic control assembly is provided in the electronic control zone; and/or the automatic meals vending machine further includes a meals transfer device provided between the heating assembly and the meals outlet to transfer the meals to the meals outlet; and/or the automatic meals vending machine further includes a packaging device provided between the heating assembly and the meals outlet to pack up heated meals; and/or a heating method of the heating assembly includes at least one of roasting heating, water bath heating, steam heating, microwave and/or light wave heating.

The device for storing and retrieving meals of the technical solution of the present application includes a meals storage shelf and a meals pickup assembly. The meals storage shelf is provided with a plurality of storage spaces evenly distributed along the circumferential and axial directions for storing meals to save space and ensure the storage capacity. The meals storage piece of the meals pickup assembly is located in the middle of the meals storage shelf. When it's needed to pick up meals, the meals pushing piece extends into the storage space through the opening of the storage space away from the meals pickup passage, and the meals is pushed to the meals storage piece, thereby completing the meals pickup. This structure rationally utilizes the space of the meals pickup passage where the meals are not stored to reduce the occupation of additional space in the lateral direction, further to reduce the overall volume of the automatic meals vending machine, which can effectively save space while ensuring the amount of meals stored. The meals pushing piece only requires telescopic movement in one direction, and the meals storage piece only needs to move in the vertical direction, which effectively improves the accuracy of position control, simplifies the structure, facilitates control, and improves meals-taking efficiency and success rate.

BRIEF DESCRIPTION OF THE DRAWINGS

In order to more clearly illustrate the technical solutions in some embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

Figure 1:
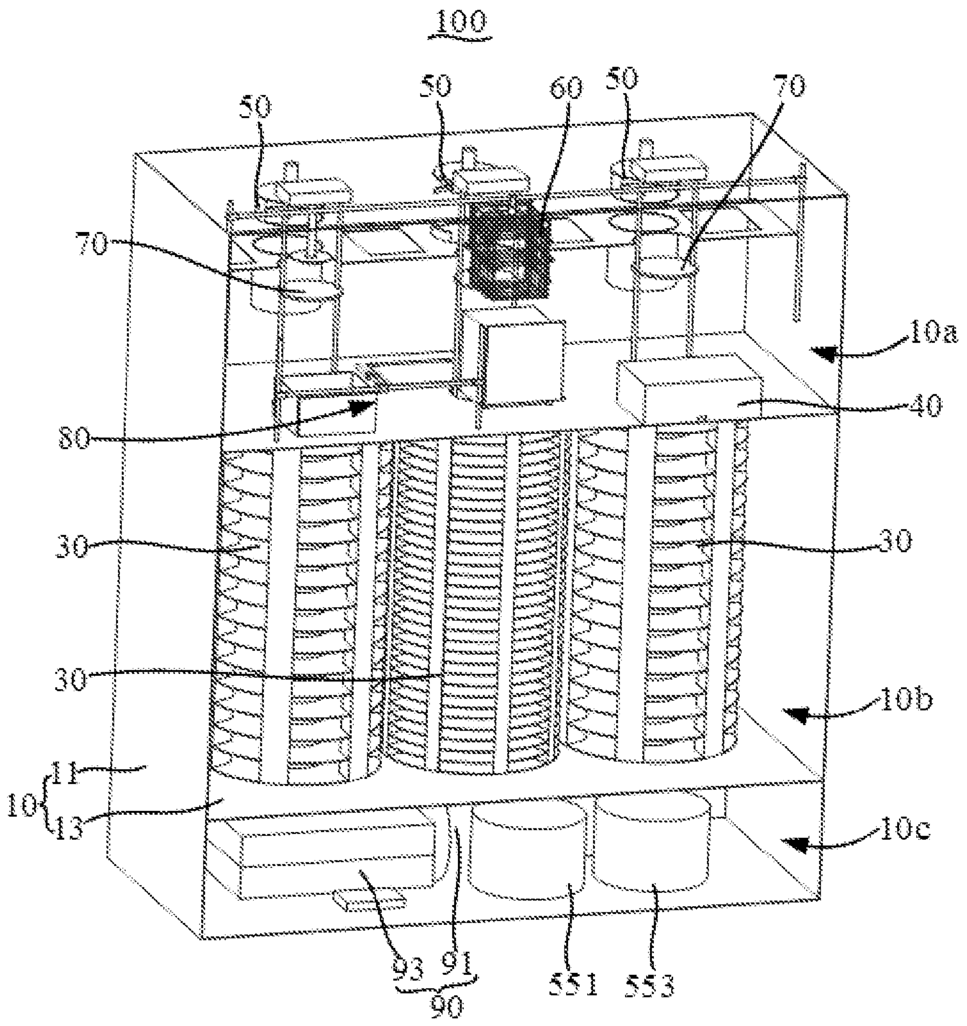
FIG. 1 is a schematic structural view of an automatic meals vending machine according to some embodiments of the present application.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings in some embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that all directional indications (such as up, down, left, right, front, rear, etc.) In some embodiments of the present application are only used to explain the relative positional relationship, movement situation, etc. among components in a specific attitude (as shown in the drawings). If the specific attitude changes, the directional indication also changes accordingly.

In the present application, unless otherwise clearly stated and limited, the terms "connection", "fixing", etc. should be understood in a broad sense. For example, "fixing" can be a fixed connection, a detachable connection, or an integral body; "connection" can be a mechanical connection or an electrical connection, can be a direct connection or an indirect connection through an intermediate medium, and also can be an internal connection between two elements or an interactive relationship between two elements, unless otherwise clearly limited. For those of ordinary skill in the art, the specific meanings of the above terms in the present application can be understood according to specific circumstances.

In addition, the descriptions related to "first", "second" and the like in the present application are merely for descriptive purposes, and should not be understood as indicating or implying their relative importance or implicitly indicating the number of technical features indicated. Therefore, the features defined by "first" and "second" may explicitly or implicitly include at least one such feature. Besides, the technical solutions among various embodiments can be combined with each other, but the combination must be based on what can be achieved by those skilled in the art. When the combination of technical solutions is contradictory or cannot be achieved, it should be considered that such combination does not exist, and is not within the scope of the present application.

The automatic vending machines currently on the market generally provide fast food boxed meals or snacks. The present application provides a device for storing and retrieving meals and an automatic meals vending machine. The automatic meals vending machine is mainly aimed at the automatic vending of traditional flavored snacks and meals. By comprehensively utilizing intelligent control modules and other means, the classic traditional food that is loved by the public is passed down, and it's convenient for users to eat authentic and affordable traditional food. Traditional flavored snacks and meals can include Chinese rolled dough, cold noodles, Chinese hamburger and various other handmade delicacies. Certainly the automatic meals vending machine can also be used for automatic vending of fast food. Furthermore, by improving the device for storing and retrieving meals of the automatic meals vending machine, an automatic meals vending machine occupied a small space with a large storage capacity is obtained.

Figure 3:
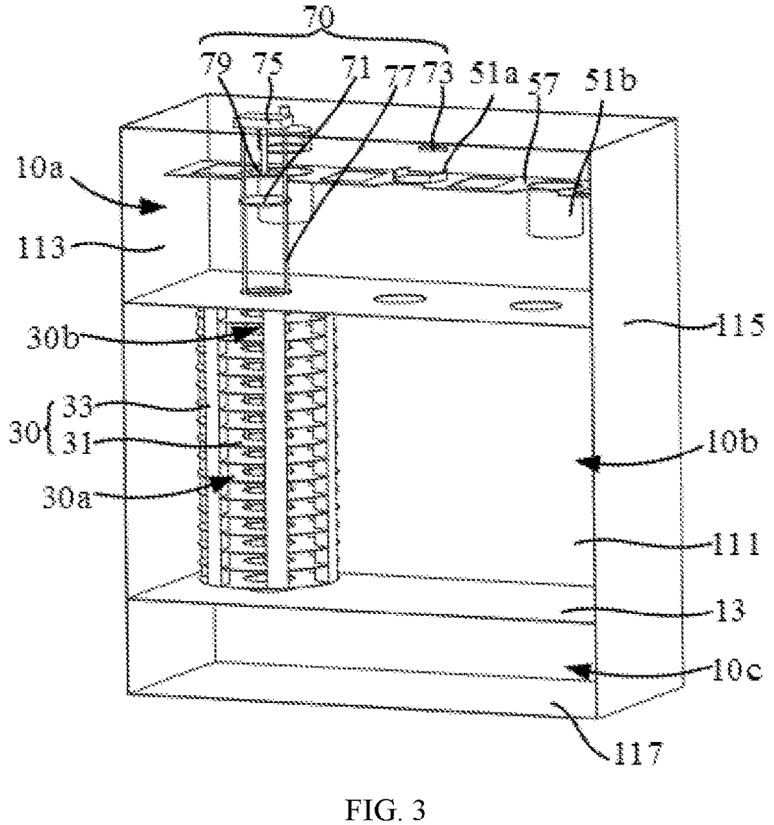
FIG. 3 is a schematic structural view of the machine shell, a meals storage shelf, a meals pickup assembly and a heating assembly in the automatic meals vending machine in FIG. 1.
Figure 4:
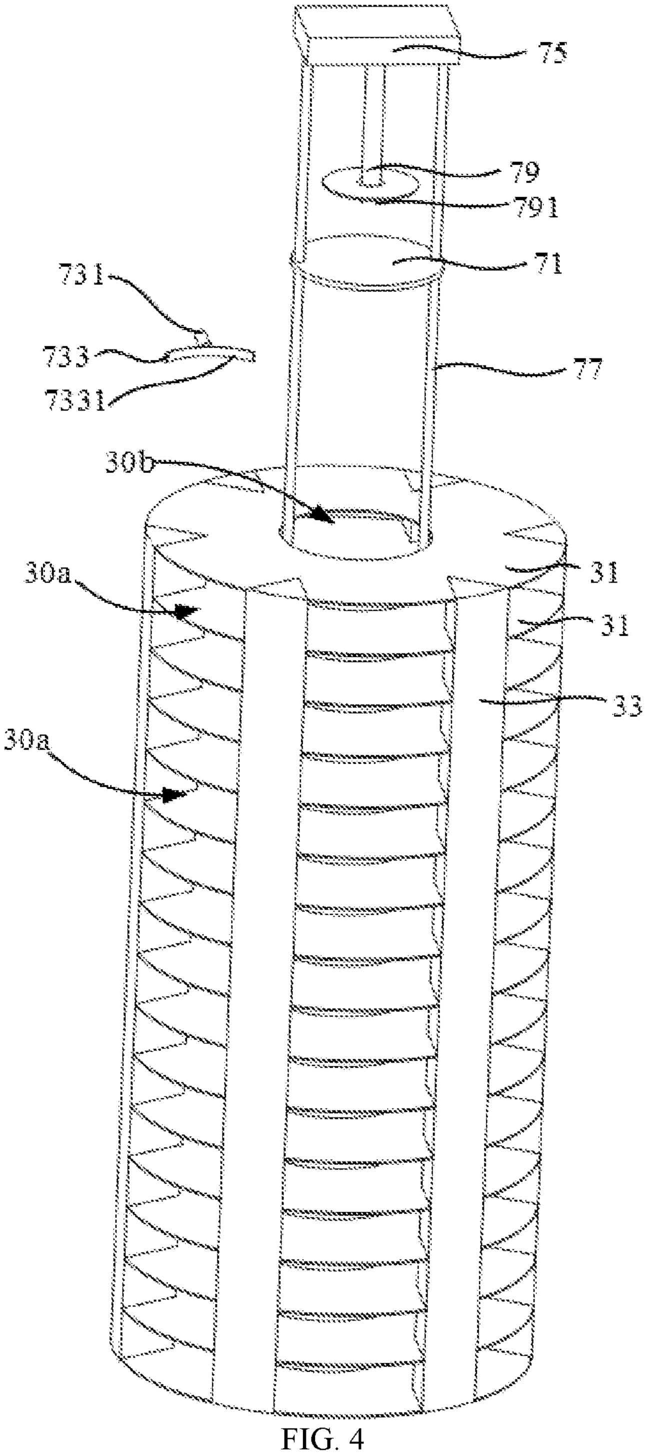
FIG. 4 is a schematic structural view of the meals storage shelf, the meals pickup assembly in the automatic meals vending machine in FIG. 1.
Figure 5:
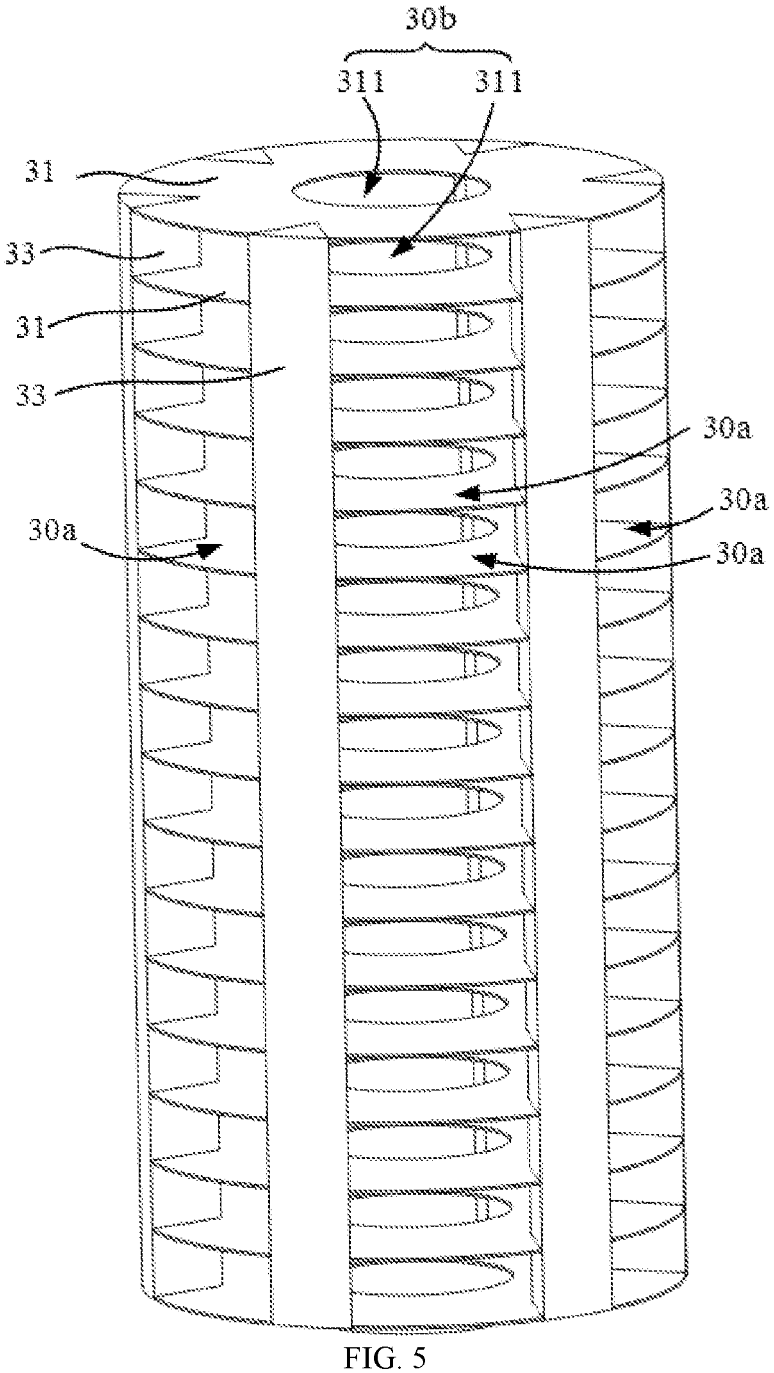
FIG. 5 is a schematic structural view of the meals storage shelf in the automatic meals vending machine in FIG. 1.

As shown in FIG. 3 to FIG. 5, in some embodiments, the device for storing and retrieving meals includes a meals storage shelf 30 and a meals pickup assembly 70. A middle part of the meals storage shelf 30 is provided with a meals pickup passage 30*b*. The meals storage shelf 30 is provided with a plurality of storage spaces 30*a* evenly arranged along a circumferential and axial directions. The plurality of storage spaces 30*a* are provided at a periphery of the meals storage shelf 30, and the meals pickup passage 30*b* is communicated with the storage spaces 30*a*. The meals pickup assembly 70 includes a meals storage piece 71 and a meals pushing piece 73. The meals storage piece 71 is provided vertically movable relative to the meals pickup passage 30*b*. The meals pushing piece 73 is provided at a side of the storage spaces 30*a* away from the meals pickup passage 30*b* and is telescopic relative to the meals storage shelf 30 to push meals in a corresponding storage space 30*a* to the meals storage piece 71.

The device for storing and retrieving meals is applied to the automatic vending machine, and can also be applied to the automatic vending machine for storing and retrieving goods. Specifically, the meals storage shelf 30 includes a plurality of storage spaces 30*a*. The plurality of storage spaces 30*a* are sequentially arranged in the circumferential and axial directions of the meals storage shelf 30, so that the storage spaces 30*a* of the meals storage shelf 30 are formed in an annular shape. In order to facilitate the placement and taking of foods, foods are usually not stored in the middle, and the space in this part is not fully utilized. Therefore, part of the structure of the meals pickup assembly 70 is located in the middle of the meals storage shelf 30, which reduces the size of the meals pickup assembly 70 and rationally uses the free space, thereby reducing the lateral surface zone of the automatic meals vending machine 100 and reducing the occupation of lateral space. In order to reduce the difficulty of taking foods, in these embodiments, the meals pickup assembly 70 includes a meals storage piece 71 and a meals pushing piece 73. The meals storage piece 71 is in the shape of a pan or a flat plate for placing foods. The meals storage piece 71 is located in the meals pickup passage 30*b*, and matches the spatial shape of the meals pickup passage 30*b*. For example, when the meals pickup passage 30*b* is a cylindrical space, the meals storage piece 71 is disk-shaped; and when the meals pickup passage 30*b* is a triangular prism, the meals storage piece 71 is also in the shape of a triangular disk. The meals pickup passage 30*b* is communicated with the storage space 30*a*, that is, foods can enter the meals storage piece 71 in the meals pickup passage 30*b* from the storage space 30*a*. The meals pushing piece 73 is disposed on an opening side of the storage space 30*a* away from the meals pickup passage 30*b*, and can be telescopically moved. The expansion and contraction of the meals pushing piece 73 is controlled by a control device, that is, a corresponding expansion and contraction device is required to drive the meals pushing piece 73, such as a cylinder, an electric push rod or a scissor push rod, etc. With a telescopic drive shaft, the meals pushing piece 73 is driven to expand and contract, which is convenient for control, and the specific structure is not limited.

Certainly, in other embodiments, the meals pickup assembly 70 can also be provided with a component that can hold tableware for taking and placing foods.

When it is necessary to pick up food, the meals pushing piece 73 can extend into the storage space 30*a* through the opening of the storage space 30*a* away from the meals pickup passage 30*b*, and push the food onto the meals storage piece 71, thus completing the food picking. In this structure, the meals pushing piece 73 only needs to telescopically move in at least one direction, and the meals storage piece 71 only needs to move in the vertical direction, which effectively improves the accuracy of position control. The meals storage piece 71 is located in the meals pickup passage 30*b*, this structure rationally utilizes the space of the meals pickup passage 30*b* that does not store food not occupying additional space, thereby further reducing the overall volume of the automatic meals vending machine 100, and effectively saving space while ensuring the amount of food stored. The meals pushing piece 73 is provided on one side of the meals storage shelf 30. Generally, the meals pushing piece 73 is in a contracted state under normal circumstances and does not take up too much space, thereby effectively saving space, simplifying the structure, facilitating control, and improving food taking efficiency and success rate.

As shown in FIG. 3 to FIG. 5, in some embodiments, the meals pickup assembly 70 further includes a first actuator 75 and two screw rods 77 provided parallel. The first actuator 75 is fixed to the meals storage shelf 30 and is configured to drive the two screw rods 77 to rotate synchronously. The meals storage piece 71 is connected to the two screw rods 77 and is located between the two screw rods 77 to be vertically movable relative to the meals pickup passage 30*b*.

In some embodiments, the meals storage piece 71 is disc-shaped to facilitate the rotation of the meals storage shelf 30. In these embodiments, in order to realize the movement of the meals storage piece 71 in the vertical direction, the meals pickup assembly 70 also includes a first actuator 75. The first actuator 75 may be a motor, a cylinder, etc., and the meals storage piece 71 is driven by the drive shaft of the first actuator 75 to achieve a vertical movement. Taking the first actuator 75 as a motor as an example, in order to achieve stable driving of the meals storage piece 71, the meals pickup assembly 70 also includes two screw rods 77, which are respectively connected to a periphery the meals storage piece 71, and is located on the same diameter of the meals storage piece 71 to ensure the stability of the movement of the meals storage piece 71. The first actuator 75 may be provided with two driving shafts to realize synchronous driving of the two screw rods 77, or two first actuators 75 may be provided to drive the two screw rods 77 respectively. The first actuator 75 can be installed on the top shell. The screw rod 77 penetrates the heating zone and the cold storage zone 10*b*. The meals storage piece 71 and the screw rod 77 are threadedly connected. When the two screw rods 77 rotate forward synchronously, the meals storage piece 71 moves downward and enters the meals storage shelf 30 to pick up the food. When the motor rotates reversely, the meals storage piece 71 is driven to move upward to send the food to the heating assembly 50 for heating. The structural arrangement of the meals pickup assembly 70 can effectively improve the stability of the movement of the meals storage piece 71, and the transmission of the screw rod 77 makes the moving position of the meals storage piece 71 more accurate, ensuring the success rate of food-taking. Certainly in other embodiments, a screw rod 77 or other driving belts or chains can also be provided for transmission.

In some embodiments, the meals pickup assembly further includes a second actuator and the second actuator is vertically movable relative to a machine shell 10. A driving shaft of the second actuator is connected to the meals pushing piece 73 to make the meals pushing piece 73 telescopic; and/or the meals pushing piece 73 is movably provided in a vertical direction; and/or a surface of the meals pushing piece 73 facing the meals storage shelf 30 is a curved surface 7331.

Based on the structure of the first actuator 75, in order to realize the movement and extension or contraction of the meals pushing piece 73, the meals pickup assembly 70 also includes a second actuator. The second actuator may also be a motor, a cylinder, an electric push rod, etc., the second actuator is movably arranged relative to the machine shell 10, specifically, moves up and down in the cold storage zone 10*b*. For example, a driving component and a transmission component connected to the driving component are installed on the partition plate 13. The driving component drives the transmission component to drive the second actuator to move up and down. In some embodiments, the driving component that drives the second actuator can be an electric motor, a motor or a cylinder, etc. The transmission component can be a screw rod, a chain, etc. to realize a liner driving, which will not be described in detail here. The meals pushing piece 73 is arranged on the driving shaft of the second actuator to realize telescopic movement. Certainly in other embodiments, a plurality of meals pushing pieces 73 can also be set in the vertical direction, so that there is no need to control the meals pushing piece 73 to move in the vertical direction. Alternatively, the meals pushing piece 73 is directly provided on the driving component and is movable along the vertical direction.

In some embodiments, the meals pushing piece 73 includes a connecting head 731 and a pushing part 733. The connecting head 731 is cylindrical and is connected to the driving shaft of the second actuator. The pushing part 733 is connected to an end of the connecting head 731 away from the second actuator. Since the automatic meals vending machine 100 of the present application is mainly aimed at traditional flavored snacks and meals, such as Chinese hamburger or cold noodles, etc., and the packaging is generally round. The surface of the pushing part 733 facing the meals storage shelf 30 is set as a curved surface 7331, thereby wrapping the food well, and ensuring that the food can enter the meals storage piece 71 smoothly. In some embodiments, the pushing part 733 is an arc segment, and the center of the arc segment is away from the connecting head 731. This structure can further improve the stability of pushing food and prevent the food from slipping to the edge of the pushing part 733, thereby improving the success rate of food pickup. Certainly in other embodiments, the meals pushing piece 73 can be set in a block shape, a rectangular strip shape, or other shapes according to the shape of the food to ensure the stability of pushing the food.

As shown in FIG. 5, in some embodiments, the meals storage shelf 30 includes a support bar 33 and at least two storage trays 31. The storage trays 31 are provided at intervals in a vertical direction and connected to the support bar 33. Two adjacent storage trays 31 and the support bar 33 are enclosed to form the storage space 30*a*.

In these embodiments, the meals storage shelf 30 includes a storage tray 31 and a support bar 33. The arrangement of the storage tray 31 can ensure the stability of food placement and prevent it from falling. The specific storage tray 31 may be circular in shape, matching the cylindrical meals pickup passage 30*b*, thereby increasing the volume of each storage space 30*a*. An automatic vending equipment with a normal size, in order to ensure the amount of food storage, and according to the volume of the food, are provided with at least two storage trays 31. In some embodiments, the number of the storage trays 31 is from 10 to 32 to ensure a larger storage capacity. The support bar 33 is provided to separate the at least two storage trays 31 to form a storage space 30*a* for placing foods, and to connect a plurality of storage trays 31 as a whole to facilitate taking foods. The support bar 33 can be disposed in the middle of the storage tray 31 or at the edge of the storage tray 31, which is not limited here. Certainly in other embodiments, the meals storage shelf 30 can also be provided with a frame structure, and the storage tray 31 is replaced by a plurality of rods arranged side by side.

As shown in FIG. 5, in some embodiments, each storage tray 31 is provided with a meals pickup hole 311 in a center and a plurality of meals pickup holes 311 in series form the meals pickup passage 30*b*. A plurality of support bars 33 are provided at a periphery of the storage trays 31 at intervals and extend towards a center of the storage trays 31. Two adjacent support bars 33 and tow adjacent storage trays 31 are enclosed to form the storage space 30*a*.

In these embodiments, the meals pickup hole 311 is opened in the center of each storage tray 31, thereby forming a meals pickup passage 30*b* extending in the vertical direction. The plurality of support bars 33 are provided and distributed around the periphery of the storage tray 31, which can provide relatively stable support and a good connection. The support bar 33 extends toward the center direction of the storage tray 31. A storage space 30*a* can also be defined between two adjacent support bars 33 and two adjacent storage trays 31, so that the meals pushing piece 73 can push the foods along the extending direction of the support plate, thereby improving the accuracy of taking foods.

In some embodiments, in order to further improve the smoothness of pushing food, the cross section of the support bar 33 is set to a fan shape, and the arc of the fan shape is co-circular with the outer edge of the storage tray 31, that is, the intersection point of the straight lines of the fan shape is towards the center of the storage tray 31, so that the sides of the two adjacent support bars 33 are parallel, and the storage space 30*a* formed is roughly rectangular, thereby ensuring the stability and accuracy of the meals pushing piece 73. In some embodiments, the extension length of the end of the support bar 33 toward the center of the storage tray 31 is not limited and can be set according to actual needs. Certainly in other embodiments, the cross section of the support bar 33 can also be set to a triangle or a quadrilateral, etc., as long as it has two surfaces forming the storage space 30*a*.

The present application also provides an automatic meals vending machine 100. As shown in FIG. 1 to FIG. 5, The automatic meals vending machine 100 includes a machine shell 10, a device for storing and retrieving meals and an electronic control assembly 90. The machine shell 10 is provided with an accommodation space and a meals outlet communicated to the accommodation space. The device for storing and retrieving meals is provided inside the accommodation space. The device for storing and retrieving meals is as any one of the device for storing and retrieving meals in the above-mentioned embodiments. The electronic control assembly 90 provided in the accommodation space and electrically connected to the meals pickup assembly 70 to control the device for storing and retrieving meals to take out meals and deliver the meals to the meals outlet. Since the device for storing and retrieving meals of the automatic meals vending machine 100 of the present application includes the structure of the device for storing and retrieving meals of any of the above embodiments, the functions brought about by this will not be described again here.

It can be understood that the automatic meals vending machine 100 is generally placed in an office building or near an office building. The traditional flavored snacks and meals in the automatic meals vending machine 100 of the present application can be used as breakfast, lunch or dinner for office workers. Certainly the automatic meals vending machine 100 can also be placed in a shopping mall or other places where there is demand, and there is no limitation here. In these embodiments, the automatic meals vending machine 100 includes a machine shell 10. The machine shell 10 includes an outer shell 11 and a partition plate 13 provided therein. The outer shell 11 forms an accommodation space for protecting components provided therein. Specifically, the outer shell 11 includes a bottom shell 117, a top shell, and a side shell connecting the bottom shell 117 and the top shell. In some embodiments, taking the shape of the outer shell 11 as a cuboid as an example, the bottom shell 117 and the top shell are both rectangular and the bottom shell are provided on the ground to ensure maximum surface zone for storing foods. The side shell includes a front panel (not shown), a rear panel 111, and a left side panel 113 and a right side panel 115. The left side panel 113 and the right side panel 115 connect the front panel and the rear panel. The front panel is facing the user, and the rear panel 111 is opposite to the front panel, the left side panel 113 is corresponding to the user's left hand, and the right side panel 115 is corresponding to the user's right hand. Certainly in other embodiments, the machine shell 10 can also be configured in a cylindrical or irregular shape to achieve a certain aesthetic effect. In order to facilitate the assembly of internal components, the outer shell 11 can be a detachably connected split structure. For example, the bottom shell 117 and the top shell are detachably connected to the side shell, or the front panel is detachably connected to the left side panel 113 and the right side panel 115, and the connection method can be at least one of snap connection, threaded connection or plug-in connection, which facilitates maintenance and cleaning.

It can be understood that in order to put the food into the meals storage shelf 30 in the machine shell 10 before selling, the machine shell 10 needs to have a food storage door (not shown), and the food storage door can be a front panel, or it can be the rear panel 111, so that the food storage door can be rotated and opened, and the food can be placed on the meals storage shelf 30. Certainly in order to facilitate users to take foods, a meals outlet (not shown) is provided on the front panel. In some embodiments, the material of the machine shell 10 can be metal or alloy, such as iron, stainless steel, aluminum, etc. It has high structural strength, good corrosion resistance, and a certain dead weight to ensure the stability of the automatic meals vending machine 100. Certainly the material of the machine shell 10 can also be other materials such as wood or plastic. It can be understood that configuring the front panel as a door for storing food is different from the existing configuration in which the door for storing food is provided on the panel away from the meals outlet. In this way, the internal structures can be installed on the partition plate 13, the rear panel 111, the left side panel 113 and the right side panel 115 to make the structure more compact. In addition, the coordination relationship of the meals pickup assembly 70 will not be affected by frequent opening and closing of the food storage door. While storing food, the structure at the meals outlet can also be inspected and repaired.

In some embodiments, in order to improve the taste, the automatic meals vending machine 100 further includes a heating assembly 50 to heat the product. The meals pickup assembly 70 is movably disposed between the meals storage shelf 30 and the heating assembly 50 to take out the foods from the storage space **30*a* and send them to the heating assembly 50** for heating and then to the meals outlet.

In some embodiments, the machine shell 10 includes an outer shell 11 and at least two partition plates 13. The outer shell 11 is provided with the accommodation space. The partition plates 13 are connected to an inner wall of the accommodation space to divide the accommodation space into a heating zone **10*a*, a cold storage zone 10*b* and an electronic control zone 10*c* from top to bottom. The meals storage shelf 30 is provided in the cold storage zone 10*b*. The heating assembly 50 is provided in the heating zone 10*a* and the heating assembly 50 is used to heat foods refrigerated in the cold storage zone 10*b*, and the meals pickup assembly 70 is movably arranged between the cold storage zone 10*b* and the heating zone 10*a*. The electronic control assembly 90 is provided in the electronic control zone 10*c* and is electrically connected with the heating assembly 50 and the meals pickup assembly 70**.

The partition plate 13 is connected to the inner wall of the outer shell 11. Specifically, there are two partition plates 13. The two partition plates 13 are spaced apart in the vertical direction, thereby dividing the accommodation space into a heating zone **10*a*, a cold storage zone 10*b* and a electronic control zone 10*c*. The meals storage shelf 30 is placed in the cold storage zone 10*b*, and has a storage space 30*a* for placing foods. When the food storage door is opened, the foods can be put into the storage space 30*a* one by one. The food is located in the cold storage zone 10*b*, which can achieve the purpose of keeping the food cold and fresh, and improve the taste of the foods. The heating zone 10*a* is an zone for heating food. The heating zone 10*a* is provided with a heating assembly 50. The heating assembly 50 is used to heat the food refrigerated in the cold storage zone 10*b* to improve the taste of the food and to provide freshly made and sold foods to the user. The electronic control zone 10*c* is used to set up the electronic control assembly 90, such as controllers, batteries or other electrical components, which can electrically connect the heating assembly 50 and the meals pickup assembly 70, thereby controlling them to achieve their respective functions and ensuring the operation of the automatic meals vending machine 100. Certainly in order to realize the refrigeration function, a compressor 91 is also provided in the electronic control zone 10*c*. The electronic control zone 10*c* is located at an end away from the heating zone 10*a*, which can also avoid some affection by overheating and improve safety. More than two partition plates 13** can also be provided to form more independent spaces.

The heating zone 10*a* is located above the cold storage zone 10*b*. According to the principle of heat flowing upward, the temperature impact on the cold storage zone 10*b* can be reduced and energy can be saved. At the same time, the heating zone 10*a* and the cold storage zone 10*b* can be provided far away from the electronic control assembly 90 to improve the performance of the electronic control assembly 90. The overall layout of the machine shell 10 can make the internal space more regular, effectively reducing the expansion of the automatic meals vending machine 100 in the lateral direction, thereby reducing the cross-sectional zone and reducing the occupation of the ground. Certainly the partition plate 13 needs to have an opening for the meals storage piece 71 to pass through. In some embodiments, a movable door can be provided at the opening, which can be opened when the meals storage piece passes through, and when the meals storage piece does not pass through, the movable door can automatically shuts off to reduce hot air from entering the refrigerated zone, further saving energy and ensuring the freshness of foods.

In some embodiments, in order to further simplify the structure, the meals pushing piece 73 is disposed on the machine shell 10 and is movably disposed in the vertical direction. The meals pushing piece 73 is fixed on the inner wall of the machine shell 10, for example, on the side shell. The meals pushing piece 73 is movably arranged in the vertical direction, and can then be moved to a position corresponding to different storage spaces 30*a*. When the meals storage piece 71 is also flush with the storage space 30*a*, the food can be pushed into the meals storage piece 71 to complete the food pickup from the storage space 30*a* at different levels in the vertical direction, thereby reducing the use of the meals pushing piece 73 and space occupation, thus simplifying the structure and reducing the volume.

In some embodiments, in order to further facilitate taking and placing foods, the meals storage shelf 30 is rotatably arranged relative to the machine shell 10. Specifically, the partition plate 13 can be provided with a component that drives the meals storage shelf 30 to rotate. The bottom of the meals storage shelf 30 is provided with a rotating shaft or a turntable to rotate under the drive of the driving component. The driving component can be located within the electronic control zone 10*c*, it is convenient for the controller 93 to control it. In this way, when placing foods, the storage space 30*a* on the same floor can be rotated to face the food storage door by rotating the meals storage shelf 30, without the operator reaching inside to place food, which reduces the difficulty of placing food. This effectively improves food placement efficiency. At the same time, when the meals pickup assembly 70 is automatically taking foods, it is also possible to rotate the meals storage shelf 30. By just providing one meals pushing piece 73, food pickup at different floors or at different positions on the same floor can be achieved. Further, The arrangement of the meals pushing piece 73 is reduced, the occupation of horizontal space is reduced, and the volume of the automatic meals vending machine 100 is further reduced.

Figure 2:
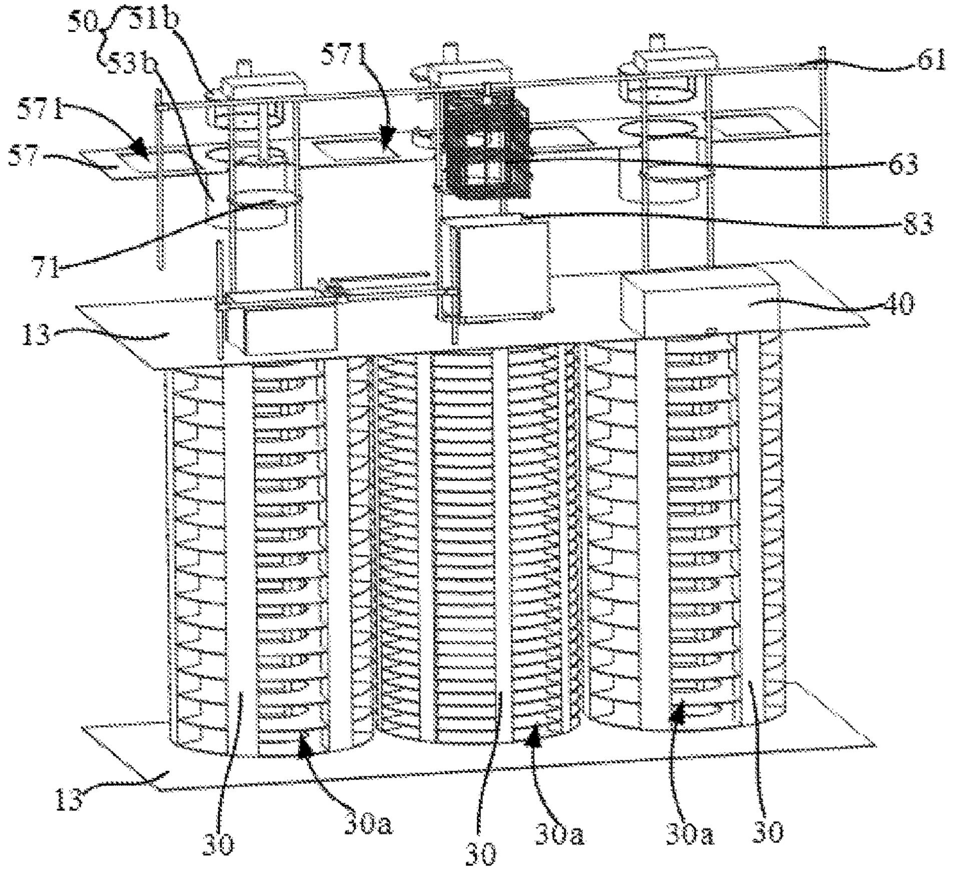
FIG. 2 is a schematic structural view of the automatic meals vending machine with a machine shell and a electronic control assembly removed in FIG. 1.

As shown in FIG. 1 and FIG. 2. In some embodiments, there are a plurality of devices for storing and retrieving meals, and the plurality of devices for storing and retrieving meals are arranged side by side in the accommodation space. In some embodiments, there are a plurality of food storage shelves 30. The plurality of food storage shelves 30 are arranged side by side at intervals in the cold storage zone 10*b*. There are a plurality of food delivery assemblies 70, and they are arranged in one-to-one correspondence with the food storage shelves 30.

In these embodiments, in order to further increase the storage capacity of the automatic meals vending machine 100, a plurality of food storage shelves 30 are provided, for example, two, three or more. The plurality of food storage shelves 30 are arranged side by side at intervals. A plurality of meals pickup assembly 70 is provided in one-to-one correspondence with the food storage shelves 30. That is to say, a movable meals storage piece 71 is provided in the meals pickup passage 30*b* of each meals storage shelf 30. The machine shell 10 is provided with a meals pushing piece 73 corresponding to the meals storage shelf 30, so that more than one kinds of foods can be served at the same time and the food delivery efficiency is improved. At the same time, the arrangement of the plurality of food storage shelves 30 can also provide the possibility to sell different food items. For example, traditional flavored snacks and meals are usually paired with at least two food items, such as the combination of cold noodle and Chinese hamburger, that is, traditional snacks in Shaanxi region.

In some embodiments, three food storage shelves 30 are provided in the machine shell 10. One of the food storage shelves 30 has a smaller storage space 30*a* than the other two food storage shelves 30, and the smaller storage space 30*a* can be used to store steamed buns of Chinese hamburger, while the storage space 30*a* of other food storage shelves 30 is larger, and can be used to place cold noodles, Chinese rolled dough, and some porridge or soup foods. Users can enjoy a Chinese hamburger together with other snacks, such that the purchase experience of the buyer can be greatly improved, and the selectivity of food can be increased. Specifically, one of the meals storage shelf 30 for placing steamed buns or pastries is provided to have 32 layers, that is, there are 32 storage trays 31, each storage tray 31 has 8 storage spaces 30*a* and there are 8 support bars 33. In addition, the other two food storage shelves 30 are provided to have 16 layers, each layer has 6 storage spaces 30*a*, where slightly larger foods, such as cold noodles, porridge, etc. can be placed, which can effectively ensure the storage capacity of the automatic meals vending machine 100. Certainly the specific specifications of the above-mentioned meals storage shelf 30 are only used to help understand the storage capacity of the automatic meals vending machine 100, and are not limited to the above-mentioned structure. The structure can be set according to actual needs. The automatic meals vending machine 100 of the present application includes a combination of a rotating meals storage shelf 30, a lifting meals storage piece 71 and a telescopic meals pushing piece 73, which compared with vending machines with similar volumes on the market, the storage capacity of food is two to three times of the storage capacity of other vending machines on the market.

Figure 6:
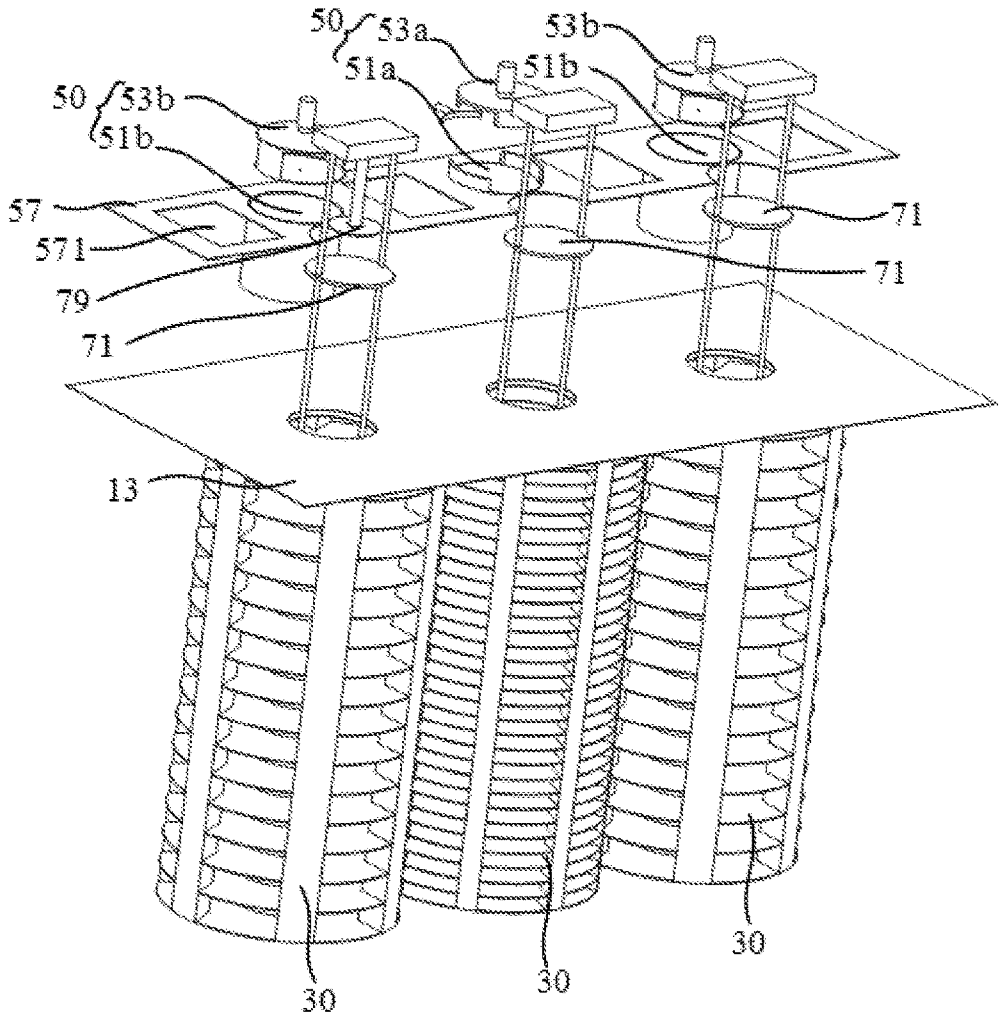
FIG. 6 is a schematic structural view of the meals storage shelf, the meals pickup assembly and the heating assembly in the automatic meals vending machine in FIG. 1.
Figure 7:
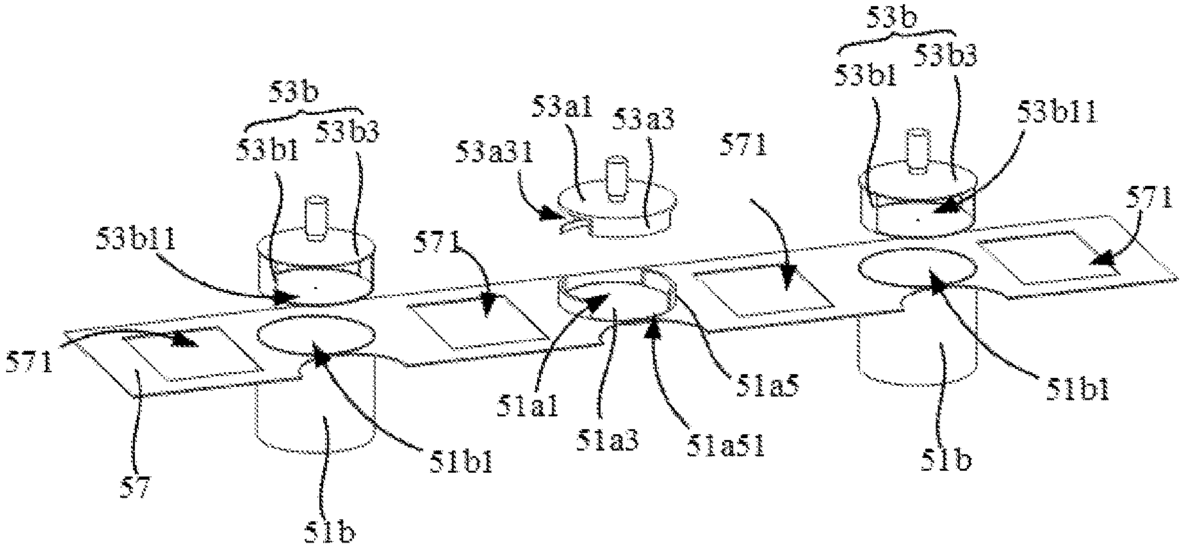
FIG. 7 is a schematic structural view of the heating assembly in the automatic meals vending machine in FIG. 1.

As shown in FIG. 6 and FIG. 7, in order to adapt to traditional flavored snacks and meals, the working mode of the heating assembly 50 provided in the machine shell 10 of the present application is different from the existing light wave or microwave heating methods. In some embodiments, the heating assembly 50 includes a vessel body 51*a*, 51*b*, a cover body 53*a*, 53*b* and a heating body. The vessel body 51*a*, 51*b* has a space to accommodate the food to be heated; the cover body 53*a*, 53*b* are movably arranged relative to the vessel body 51*a*, 51*b* to cover or open the vessel body 51*a*, 51*b*. The cover body 53*a*, 53*b* is closed with the vessel body 51*a*, 51*b* to form a heating cavity, The heating body is provided on the vessel body 51*a*, 51*b* and/or the cover body 53*a*, 53*b*, and is used to achieve at least one of roasting heating, water bath heating or steam heating.

One of the vessel body 51*a*, 51*b* and the cover body 53*a*, 53*b* has a meals inlet 51*a*51, 53*b*11, so that the meals pickup assembly 70 can put food into it through the meals inlet 51*a*51, 53*b*11.

In these embodiments, the heating assembly 50 includes a vessel body 51*a*, 51*b*, which is fixed to the heating zone 10*a* of the machine shell 10. Specifically, a heating body is provided on the vessel body 51*a*, 51*b* and/or the cover body 53*a*, 53*b*, and the heating body can generate heat and transfer the heat to the vessel body 51*a*, 51*b* and/or the cover body 53*a*, 53*b* to heat the food. The vessel body 51*a*, 51*b* is fixedly connected to the outer shell 11, for example, the vessel body 51*a*, 51*b* is fixedly connected to the side shell, so that there is a certain distance between the vessel body 51*a*, 51*b* and the partition plate 13 to prevent excessive heat transfer to the cold storage zone 10*b*, thereby improving the refrigeration effect of cold storage zone 10*b*. The vessel body 51*a*, 51*b* and the cover body 53*a*, 53*b* can be movably mounted on the outer shell 11, so that they can be moved relative to the vessel body 51*a*, 51*b* to cover or open the vessel body 51*a*, 51*b*. The vessel body 51*a*, 51*b* and the cover body 53*a*, 53*b* cooperate to form a heating cavity for heating of the food placed inside. The movable cover body 53*a*, 53*b* can be achieved by a driving cylinder or a motor connecting to a transmission member that converts rotational motion into linear motion.

When the food in the meals storage shelf 30 is a Chinese hamburger, the best texture of the buns is crispy. Therefore, the heating method of the heating assembly 50 is selected to be grilled and heated, thereby improving the taste. When the food in the meals storage shelf 30 is cold noodles or Chinese rolled dough, since the cold noodles or Chinese rolled dough are cold food, there is no need to heat at a high temperature. In addition, because the refrigerated dough will become slightly hard and affect the taste, so steam heating is selected. This kind of food only needs to be slightly heated to warm it up to improve the taste and avoid being too cool and affecting digestion. When the food is porridge or soup, in order to avoid overdrying or insufficient heating temperature, the heating method is set to water bath heating, which can increase the heating temperature without losing the original taste of the food.

In some embodiments, the heating assembly 50 can realize at least one of roasting heating, water bath heating, and steam heating, which can significantly reduce the requirements for the outer surface material of the food and effectively reduce costs. Different types of snacks according to the heating method can be prepared to combine the traditional food with automatic vending, thereby expanding the application scenarios. At the same time, depending on the heating method, one of the vessel body 51*a*, 51*b* and the cover body 53*a*, 53*b* has a meals inlet 51*a*51, 53*b*11 to facilitate the meals pickup assembly 70 to pass through the meals inlet 51*a*51, 53*b*11 and place the food into the heating cavity to simplify the operation process.

It can be understood that the heating assembly 50 is disposed above the meals storage shelf 30. During the up and down movement of the meals storage piece 71, foods can be taken in the meals pickup passage 30*b* and the foods can be moved to the heating cavity in the heating zone 10*a*. In some embodiments, the meals pickup assembly 70 also includes a food pushing rod (not shown). The food push rod is telescopically located on one side of the meals storage piece 71. The meals storage piece 71 is flush with the meals inlet 51*a*51, 53*b*11. At the same time, the food pushing rod pushes the foods on the meals storage piece 71 into the heating assembly 50 through the meals inlet 51*a*51, 53*b*11.

The structure of the food pushing rod can be the same as the structure of the above-mentioned meals pushing piece 73, but the direction is opposite, which facilitates processing. The meals pushing piece 73 is provided on the rear panel 111 to push the foods from the storage space 30*a* toward the front panel finally into the meals storage piece 71. The food pushing rod is provided on the front panel. When the meals storage piece 71 is flush with the meals inlet 51*a*51, 53*b*11, the food pushing rod push the food toward the rear panel 111 into the meals inlet 51*a*51, 53*b*11. In this way, the heating assembly 50 is disposed above and behind the meals storage shelf 30 and can be far away from the front panel, so that excessive heat will not be generated at the meals outlet, thereby protecting users. Alternatively, other structures of transfer components, such as manipulators or clamping components, may be provided to transfer the meals to the heating assembly 50.

As shown in FIG. 7, in some embodiments, when the heating assembly 50 adopts the roasting heating method, the vessel body 51*a* is formed with a heating groove 51*al*, and the heating body is provided on the surface of the vessel body 51*a* away from the heating groove 51*al* and/or inside the cover body 53*b*. Specifically, the heating body is a resistance wire or a heating tube. For example, the heating assembly 50 can be an electric baking pan type device. The resistance wire or heating tube is disposed on the surface of the vessel body 51*a* away from the heating groove 51*al*. After power is supplied, the resistance wire or heating tube generates heat and transfers the heat to the vessel body 51*a*, so that the heating groove 51*al* generates heat to heat the food. Since the heating body of this heating method is arranged on the surface away from the heating groove 51*al*, a meals inlet 51*a*51 is opened on the groove wall of the heating groove 51*al*, so that the food can directly enter the heating groove 51*al* through the meals inlet 51*a*51 to close the heating body, thus improving the heating effect. Certainly both the vessel body 51*a* and the cover body 53*b* can be provided with heating bodies to achieve double-sided heating, and the effect of heating is better.

Under normal circumstances, the cover body 53*a* can be set away from the vessel body 51*a*, and the sensor is provided. When it detects that the meals pickup assembly 70 has transported the food to be flush with the meals inlet 51*a*51, the food is moved into the heating groove 51*al* and then the cover body 53*a* is controlled to cover the heating groove 51*al*, thereby triggering the heating element to generate heat. Since grilling heats up quickly, the heating time here should not be too long, and the optional range is 1 minute to 2 minutes.

As shown in FIG. 7, in some embodiments, in order to simplify the structure, the vessel body 51*a* includes a bottom plate 51*a*3 and a side plate 51*a*5 located around the edge of the bottom plate 51*a*3. The bottom plate 51*a*3 and the side plate 51*a*5 enclose a heating groove 51*al*. The side plate 51*a*5 is provided with a meals inlet 51*a*51. The cover body 53*a* includes a cover plate 53*al* and a surrounding plate 53*a*3 located on the periphery of the cover plate 53*al*. The surrounding plate 53*a*3 is provided with an avoidance hole 53*a*31. The cover body 53*a* covers the vessel body 51*a*, the side plate 51*a*5 corresponding to the avoidance hole 53*a*31 is covered, and the surrounding plate 53*a*3 correspondingly covers the meals inlet 51*a*51.

The shape of the vessel body 51*a* is disc-shaped, matching the shape of the steamed buns to be heated. The shape of the cover plate 53*al* matches the bottom plate 51*a*3, and the shape of the side plate 51*a*5 matches the surrounding plate 53*a*3. In some embodiments, a meals inlet 51*a*51 is provided on the side plate 51*a*5. At the same time, in order to achieve closed heating, when the cover body 53*a* is closed on the vessel body 51*a*, the surrounding plate 53*a*3 can cover the meals inlet 51*a*51 to prevent heat loss, thereby improving heating effect. In order to further ensure the sealing performance, the surrounding plate 53*a*3 is provided with an avoidance hole 53*a*31 at a position corresponding to the side plate 51*a*5. In this way, when the cover body covers the vessel body to heat meals, the surrounding plate 53*a*3 can be inserted into the meals inlet 51*a*51, and the side plate 51*a*5 can be inserted the avoidance hole 53*a*31, so that the surrounding plate 53*a*3 and the side plate 51*a*5 are on the same circumferential surface, preventing heat loss and improving the heating effect.

As shown in FIG. 7, in some embodiments, when the heating assembly 50 is heated by steam or water bath, the heating element is provided on the body 51*b*. The body 51*b* has a cylindrical structure with one end open, and the body 51*b* has a preset capacity of water. The heating element can be a heating tube, a resistance wire or an electromagnetic structure which can heat the water. The cover body 53*b* is provided with a meals storage portion 53*b*1 facing the body 51*b*, and the meals storage portion 53*b*1 is provided with a space for holding food. The meals storage portion 53*b*1 is provided with a meals inlet 53*b*11. The meals storage portion 53*b*1 is located above the water or immersed in the water, thereby realizing steam heating or water bath heating, so as to make the heated food taste better and reduce heating cost.

In some embodiments, the cover body 53*b* further includes a top cover body 53*b*3. The meals storage portion 53*b*1 has a cylindrical structure with one end open. The top cover body 53*b*3 is connected to the opening edge of the meals storage portion 53*b*1 to form a space for placing foods. A meals inlet 53*b*11 is provided on the peripheral side of the meals storage portion 53*b*1. When the meals storage piece 71 moves to a position flush with the meals inlet 53*b*11, the food is pushed from the meals storage piece 71 into the meals storage portion 53*b*1 through the food pushing rod. Certainly in order to achieve steam heating, the depth of the meals storage portion 53*b*1 is smaller than the depth of the body 51*b*, thereby ensuring sufficient hot water storage and providing a better heating effect. Certainly for steam heating and water bath heating, in order to facilitate processing, the structures of the heating assembly 50 of the two methods can be set the same, and only the depth of water introduced into the body 51*b* is different, that is, when adapting the steam heating method, the body 51*b* has a lower water level, and when adapting the water bath heating, the body 51*b* has a higher water level.

As shown in FIG. 6, when it is necessary to punch holes in the food, in some embodiments, the meals pickup assembly 70 also includes a puncher 79. The puncher 79 is fixed above the meals storage piece 71, and a side of the puncher 79 facing the surface of the meals storage piece 71 is provided with a needle 791 for punching holes in the food packaging boxes on the meals storage piece 71.

In these embodiments, the meals pickup assembly 70 further includes a puncher 79, and the puncher 79 is located above the meals storage piece 71. Specifically, the puncher 79 can be provided on the driving component of the meals storage piece 71 and between the two screw rods 77. When the meals storage piece 71 moves up and down as the screw rod 77 rotates, the puncher 79 is fixed. When the distance between the meals storage piece 71 and the puncher 79 reaches a certain preset distance, the needle 791 of the puncher 79 can contact the food packaging box, thereby punching holes in the food packaging box. After pinning, the puncher 79 can move down to the corresponding position to push the food.

This hole puncher can be combined with steam heating. When the food is steam-heated, the hole puncher can increase the contact zone between steam and food, thereby heating the food more efficiently and making the food taste better.

As shown in FIG. 1 and FIG. 7, in some embodiments, in order to ensure that the heating assembly 50 may realize heating function smoothly, the heating assembly 50 also includes a supply part. The supply part is located in the electronic control zone 10*c* and is connected to the body 51*b* through pipes or wires to realize the heating function of body 51*b*. The supply part differs according to the heating method. For example, when the heating method is baking heating, the supply part is a battery component or a circuit component. When the heating method is water bath heating or steam heating, the supply part can be a water tank 551 and a heating pipe. The water tank 551 is located in the electronic control zone 10*c* and is communicated with the body 51*b* through the pipe.

In addition, the heating assembly 50 is set to have a self-cleaning function. For example, the body 51*b* is also connected to a drainage pipe, and a sewage tank 553 is provided in the electronic control zone 10*c*. Through the control of the controller 93, when the automatic meals vending machine 100 is idle, the automatic cleaning of the body 51*b* is carried out at this time, that is, the drainage pipe is opened to allow the internal water to flow into the sewage tank 553, and then the drainage pipe is closed and the water inlet pipe is opened to replenish clean water to the body 51*b*.

As shown in FIG. 6 and FIG. 7, in some embodiments, a plurality of food storage shelves 30 are provided, for example, two or three or more, a plurality of food delivery assemblies 70 are provided correspondingly, and a plurality of heating assemblies 50 are correspondingly provided. The heating element of the heating assembly 50 has at least two of roasting heating, water bath heating or steam heating. In order to provide a better purchasing experience, the automatic meals vending machine 100 places different types of foods on different food storage shelves 30 to satisfy the user's free choice of food set. In some embodiments, in view of the matching habits of traditional flavored snacks and meals, the set foods are at least two of porridge and soup, Chinese hamburger, cold noodles and Chinese rolled dough. Therefore, the heating assembly 50 correspondingly has at least two of roasting heating, water bath heating or steam heating to provide targeted heating methods, thereby improving the food taste and user experience.

In some embodiments, when there are three food storage shelves 30, the three heating assemblies 50 respectively have one heating structure of the above three heating methods, and the bodies 51*a*, 51*b* of the three heating assemblies 50 can be connected to the machine shell 10 through a connecting plate 57, and have a certain distance from the partition plate 13 and the top shell to facilitate heat dissipation. At the same time, the connecting plate 57 is provided with a heat dissipation hole 571 between two adjacent bodies 51*a*, 51*b*, so that the heat of the vessel body 51*a*, 51*b* can be dissipated upward through the heat dissipation hole 571, reducing the transferring of heat to the cold storage zone 10*b*, which is more conducive to the preservation of food and the heat dissipation of the heating zone 10*a*.

Figure 8:
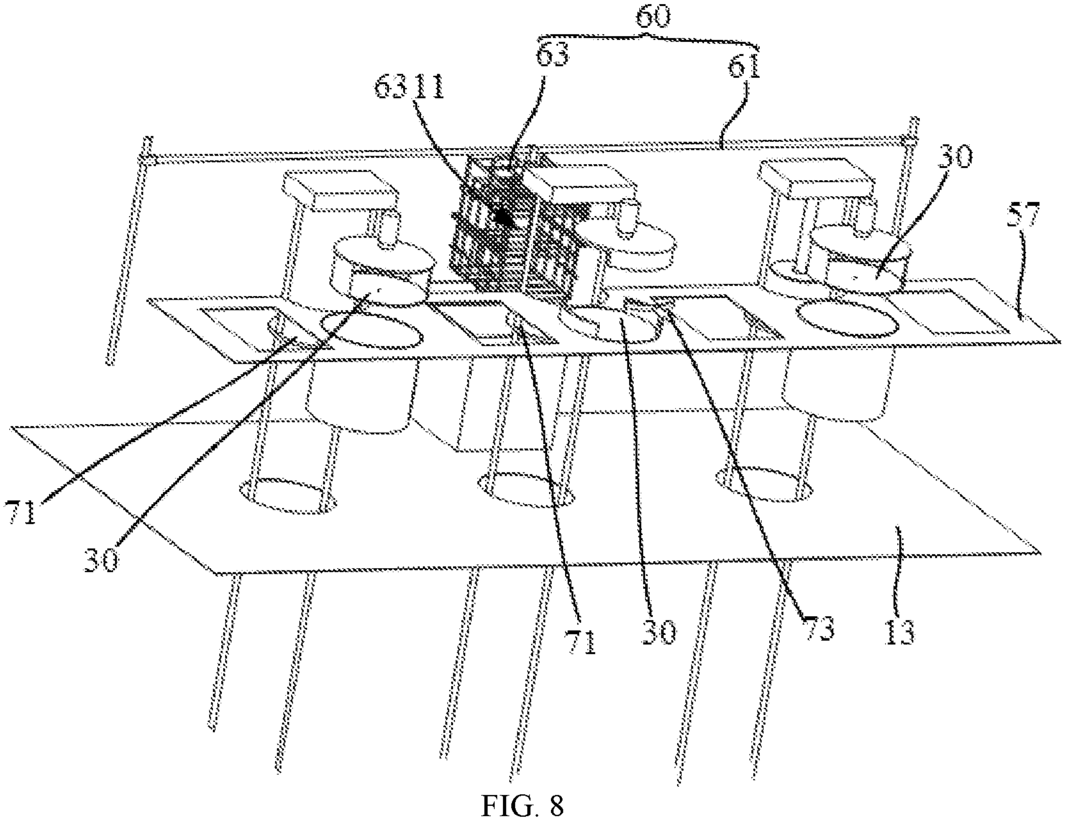
FIG. 8 is a schematic structural view of the heating assembly, the meals pickup assembly and a meals transfer device in the automatic meals vending machine in FIG. 1.
Figure 9:
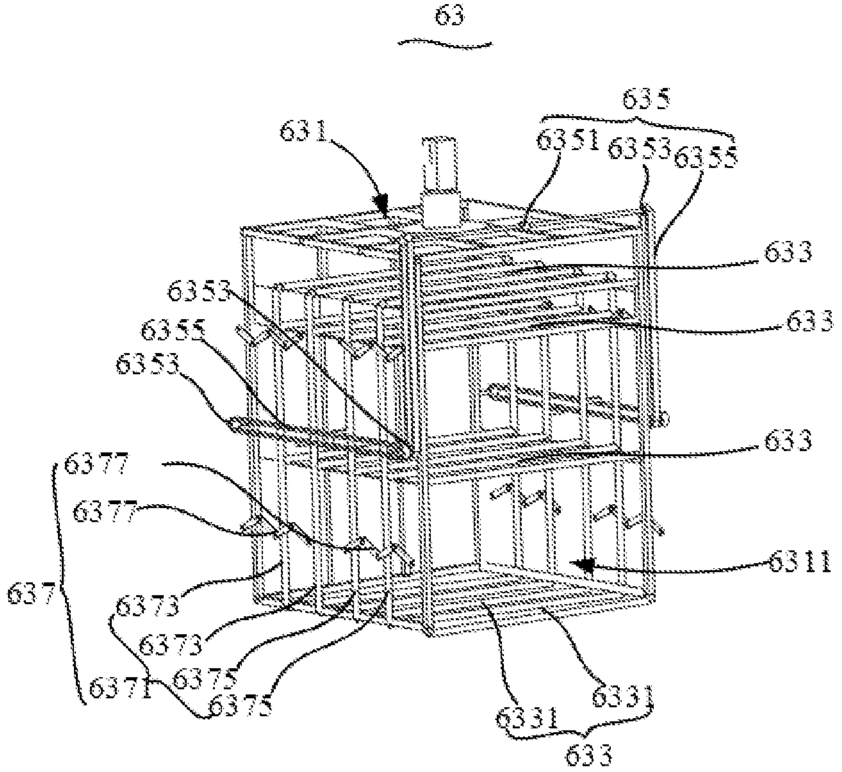
FIG. 9 is a schematic structural view of the meals transfer device in the automatic meals vending machine in FIG. 1.
Figure 10:
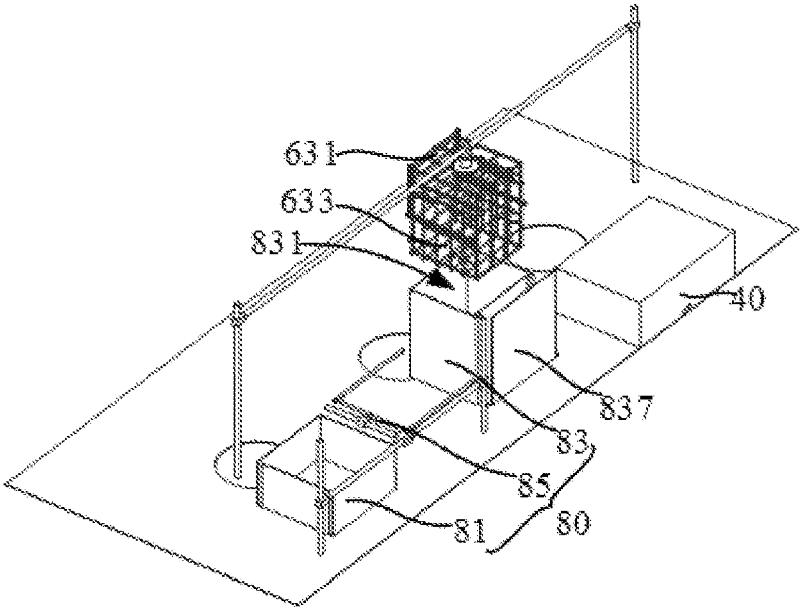
FIG. 10 is a schematic structural view of the meals transfer device and a packaging device in the automatic meals vending machine in FIG. 1.

As shown in FIG. 8 to FIG. 10, since after completing the heating of the foods, the foods need to be transferred to the meals outlet, a meals pushing piece 73 is also provided on the side of the heating assembly 50 away from the meals storage piece 71, that is, the food in the heating assembly 50 is pushed to the meals storage piece 71, and then from the meals storage piece 71 to the meals outlet, or other components that can receive the transfer. The meals pushing piece 73 has the same structure as the meals pushing piece 73 during the food taking process, or the meals pushing piece 73 can be the meals pushing piece 73 during the food taking process directly moving to a position flush with the heating assembly 50 to achieve the function of pushing the food. In this way, by reducing components, the structure can be simplified, and the processing costs can be reduced.

In order to better limit the position of foods, a meals delivery box 83 is generally provided at a position corresponding to the meals outlet. The meals delivery box 83 has a meals delivery space 831, and the foods are pushed into the meals delivery space 831 to prevent it from falling elsewhere. In some embodiments, the automatic meals vending machine 100 is also provided with a meals transfer device 60. The meals transfer device 60 is provided between the meals pickup assembly 70 and the meals delivery box 83. The meals transfer device 60 includes a bracket 61 and a transfer box 63. The transfer box 63 is installed on the bracket 61. The bracket 61 is connected to the outer shell 11. The bracket 61 can drive the transfer box 63 up and down. The transfer box 63 includes a frame body 631 and a movable bottom plate 633. The frame body 631 and the movable bottom plate 633 are enclosed to form a storage cavity. One side of the frame body 631 is a fixed opening 6311. The fixed opening 6311 is used to allow the food from the heating assembly 50 to enter the storage cavity. The bottom surface of the frame body 631 faces the meals delivery box 83. The movable bottom plate 633 is movably connected to the bottom surface of the frame body 631 to open or close the bottom surface of the frame body 631.

The transfer box 63 is specifically located between the meals storage piece 71 and the meals delivery box 83. The transfer box 63 includes a frame body 631. The frame body 631 is generally in the shape of a rectangular parallelepiped or a cube and has six surfaces. The movable bottom plate 633 is movable on the surface of the frame body 631, and the movable bottom plate 633 and the frame body 631 cooperate to form a storage cavity. Certainly the frame body 631 can also be a cylinder or other shapes. The storage cavity has a fixed opening 6311 facing the meals storage piece 71 for receiving foods. At the same time, the bracket 61 drives the transfer box 63 up and down, so that the transfer box 63 can move between the heating assembly 50 and the meals delivery space 831 of the meals delivery box 83. A sensor is set at the transfer box 63. When it is detected that the food is being placed into the storage cavity, the transfer box 63 moves downward into the meals delivery space 831, and then the movable bottom plate 633 will automatically open the bottom surface of the frame body 631, allowing the food to fall into the meals delivery space 831. In addition, the bracket 61 can also be configured to be movable in the horizontal direction, so as to realize corresponding functions according to different needs.

The meals transfer device 60 may store foods and deliver the meals to the meals delivery space 831. In this way, the transfer box 63 can control the movable bottom plate 633 to open the bottom surface of the frame body 631 after entering the meals delivery space 831, so that the food will not fall from a high place when the food is served, effectively ensuring the integrity of the food. The purchasing experience is improved, and the transfer structure is simple and requires low driving precision of the movable bottom plate 633 and the transfer box 63 to ensure fast food delivery.

As shown in FIG. 9, in some embodiments, in order to facilitate control, the transfer box 63 also includes a driving component 635. The driving component 635 can be a motor, a motor or a cylinder. The driving component 635 is installed on the frame body 631. The bottom rods 6331 are driven by the driving component 635 and can be moved in parallel relative to the bottom surface of the frame body 631. When the bottom rods 6331 are evenly spaced on the bottom surface of the frame body 631, the movable bottom plate 633 closes the bottom surface of the frame body 631. When a plurality of bottom rods 6331 near one side are driven by the driving component 635 to move toward the one side, the remaining bottom rods 6331 are driven to move toward the opposite side, and the movable bottom plate 633 opens the bottom surface of the frame body 631.

The movable bottom plate 633 is provided with at least two bottom rods 6331, that is, at least two bottom rods 6331 constitute the movable bottom plate 633. When the bottom rods 6331 are evenly distributed on the bottom surface of the frame body 631, they can play a role in supporting the foods. When some of the plurality of bottom plates 51*a*3 move collectively toward one side of the frame body 631, the remaining bottom plates 51*a*3 move toward the other side of the frame body 631, such that the bottom surface of the frame body 631 can be opened, and the food can fall out without taking up extra space, making the space occupied smaller.

As shown in FIG. 9, in order to reduce the impact of the driving component 635 on the smooth transfer of foods, in some embodiments, the transfer box 63 also includes a movable side plate 637. The movable side plate 637 has the same structure as the movable bottom plate 633. The movable side plate 637 includes at least two side rods 6371. The side rods 6371 are connected to the bottom rod 6331 in a one-to-one correspondence. Each side plate 51*a*5 is connected to an end of a bottom rod 6331. The driving component 635 is installed on the side of the frame body 631. The driving component 635 drives part of the side rods 6371 to move toward one side of the frame body 631, and the remaining side rods 6371 to move toward the opposite side, thereby driving a plurality of bottom rods 6331 to move for driving the movable bottom plate 633 to open the bottom surface of the frame body 631, thus realizing transfer of foods. This structure prevents the bottom rod 6331 of the movable bottom plate 633 from being interfered by other structures, which can make the food slide down more smoothly and improve the food delivery effect.

In some embodiments, the side rod 6371 moving toward one side of the frame body 631 is set as the first side rod 6373, and the side rod 6371 moving toward the opposite side is set as the second side rod 6375. In order to further simplify the transfer box 63 structure and reduce the number of driving components 635, a telescopic member 6377 is provided to connect two adjacent side rods 6371 moving towards the same side. When foods put on the movable bottom plate 633, the telescopic member 6377 can be extended to make the two adjacent side rods 6371 apart from each other. When it's necessary to serve the foods, the telescopic member 6377 can be contracted or folded when the side rods 6371 move to reduce the distance between the two side rods 6371. When the driving component 635 drives the first side rod 6373 located in the middle position, the first side rod 6373 compresses the telescopic member 6377 to reduce the distance between the adjacent first side rods 6373 until the adjacent first side rods 6373 are pushed to move, thereby realizing the open state of the movable bottom plate 633. This structure is similar to the device for opening and closing curtains. There is no need for each side rod 6371 to be provided with a driving component 635, so that the sides and bottom of the frame body 631 can be quickly opened or closed with fewer driving components 635, which can effective save material costs and energy consumption. The telescopic member 6377 may be two metal bars hinged to each other, or may be a structure such as a telescopic rod, which is not limited here.

As shown in FIG. 9, in some embodiments, in order to further reduce energy consumption, the driving component 635 includes a driving part 6351, a transmission wheel 6353, and a transmission belt 6355 provided between the driving part 6351 and the transmission wheel 6353. The driving part 6351 and the transmission wheel 6353 are respectively provided on opposite sides of the frame body 631. One of the adjacent first side rods 6373 and the second side rods 6375 is connected to one surface of the transmission belt 6355, and the other is connected to the other surface of the transmission belt 6355. Specifically, the driving part 6351 may be a motor or the like. The driving part 6351 drives the transmission belt 6355 to rotate. The two opposite moving surfaces of the transmission belt 6355 face different directions respectively. Therefore, one of the adjacent first side rods 6373 and the second side rods 6375 is connected to one surface of the transmission belt 6355, and the other is connected to the other surface of the transmission belt 6355. Driven by the driving part 6351, the first side rod 6373 and the second side rod 6375 are driven by the transmission belt 6355 to move, thereby opening the movable bottom plate 633. In some embodiments, the movement of the side rod 6371 in two different directions can be realized by only one driving part 6351, further simplifying the structure and saving costs.

In some embodiments, in order to be able to transfer more foods at one time, a plurality of movable bottom plates 633 are provided, for example, two, three or more. The plurality of movable bottom plates 633 are spaced apart from the bottom surface to the top surface of the frame body 631, thereby dividing the storage cavity into a plurality of layers and effectively increasing the amount of food storage. As shown in FIG. 8 and FIG. 9, when there are a plurality of food storage shelves 30, there are a plurality of food delivery assemblies 70 and a plurality of heating assemblies 50. When there are multiple kinds of foods that need to be served together, in order to improve the food delivery efficiency, the bracket 61 is extended along the arrangement direction of the food storage shelves 30, and the transfer box 63 can move along the extending direction. That is, the transfer box 63 move between a plurality of food storage shelves 30 and a plurality of heating assemblies 50. Specifically, the movement method can achieved through a driving structure combining a motor with a screw rod, or a transmission belt. With this structure, when the user selects at least two kinds of food, the transfer box 63 moves to different heating assembly 50, and after receiving the corresponding food, with a plurality of movable bottom plates 633 provided. the different food is placed on the movable bottom plates 633 of different floors. In this way, the storage cavity can be divided into spaces of different sizes according to the volume of the food, so as to meet the food storage needs while reducing the accumulation or extrusion of the food, ensuring the integrity and appearance of the food, and improving the buying experience. When there is only one movable bottom plate 633, the foods can be placed on the same movable bottom plate 633 and transferred together, such that the structure is much simpler.

As shown in FIG. 8, in some embodiments, the meals pushing piece 73 is telescopically provided on one side of the heating assembly 50. When the movable bottom plate 633, the meals storage piece 71 and the heating assembly 50 are flush with each other, the meals pushing piece 73 will push food on the heating assembly 50 to the movable bottom plate 633 through the meals storage piece 71 and the fixed opening 6311. In some embodiments, the meals pushing piece 73 for pushing the food into the movable bottom plate 633 can have the same structure as the meals pushing piece 73 for pushing the food into the meals storage piece 71, or the above two meals pushing pieces 73 can be combined into one to push the food. The meals pushing piece 73 can move between the cold storage zone 10*b* and the heating zone 10*a* to realize two food pushing actions.

Figure 11:
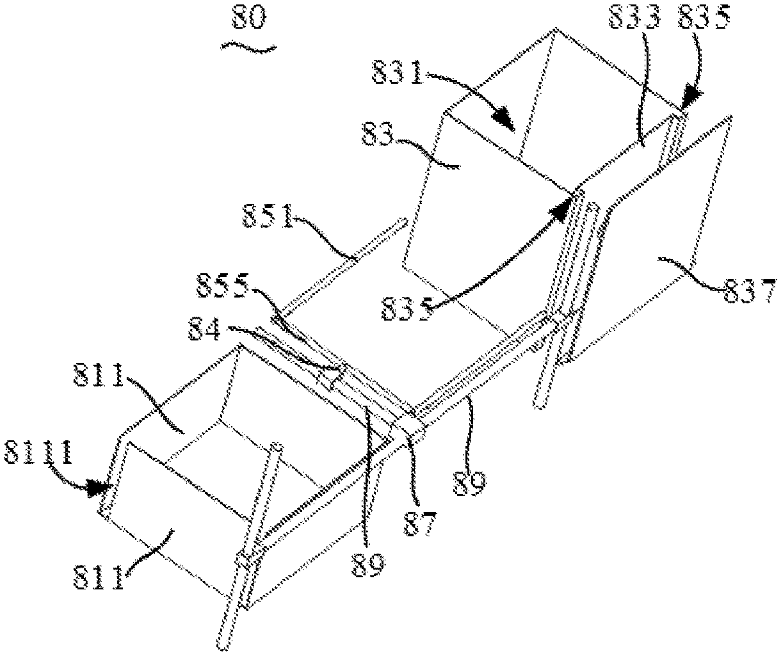
FIG. 11 is a schematic structural view of the packaging device in the automatic meals vending machine in FIG. 1.

As shown in FIG. 10 and FIG. 11, the automatic meals vending machine 100 includes the meals pickup assembly 70, the meals storage shelf 30 structure and the heating assembly 50 of the above structure. Since the food will be hot to a certain extent after being heated, in some embodiments, the automatic meals vending machine 100 further includes a packaging device 80. The packaging device 80 is provided between the heating assembly 50 and the meals outlet to place the packaging bag into the meals delivery space 831 to package the food.

In these embodiments, the automatic meals vending machine 100 is adapted to traditional flavored snacks and meals whose packaging is different from existing fast meals delivery boxes. Since these kinds of foods without packaging for being easily carried will scald the user after being heated, a packaging device 80 is provided, which can automatically pick up the packaging bag, put it into the meals delivery space 831, and pack the food placed in the meals delivery space 831. The user can directly lift the packaging bag when picking up the food without direct contact with food, thereby reducing the chance of burns and effectively improving the consumer experience. At the same time, no matter with or without the heating assembly 50, a plurality of food storage shelves 30 is provided, when a plurality of kinds of foods are served at the same time, the transfer box 63 can greatly improve the food delivery efficiency, and the packaging device 80 can also pack up a plurality of foods together, which is a good solution to the problem of being inconvenient to carry due to the large variety of different foods when purchased at the same time. It increases the chance of purchasing a plurality of food packages, and is more healthy and hygienic, improving convenience and security.

When a meals transfer device 60 is provided, as shown in FIG. 10 and FIG. 11, in some embodiments, the packaging device 80 is provided between the meals transfer device 60 and the meals outlet. In order to realize automatic packaging by the packaging device 80, the packaging device 80 is electrically connected to the electronic control assembly 90, and the foods are packaged through the control of the electronic control assembly 90. Specifically, the packaging device 80 includes a fixed seat, a bag storage box 81, a meals delivery box 83 and a bag pickup piece 85. The fixed seat can be set separately and fixed on the partition plate 13, or the fixed seat can a portion of as the structure of the above-mentioned partition plate 13, and the bag storage box 81 is fixed on a fixed seat for storing folded packaging bags. Specifically, the bag storage box 81 can be fixed on the side of the meals pickup assembly 70 near the front panel. The meals delivery box 83 is located on one side of the bag storage box 81 to place the packaging bags to be used. The inside of the meals delivery box 83 is provided with a fixed part, the bag pickup piece 85 is movably installed on the fixed seat to grab the packaging bags in the bag storage box 81 and send them to the inside of the meals delivery box 83, the bag pickup piece 85 cooperates with the fixing part to open the packaging bag, so that the opened packaging bag receives the food from the meals transfer device 60. The packaging bag is in a folded state, and a plurality of packaging bags are stacked and stacked in the bag storage box 81. In some embodiments, the material of the packaging bag can be paper, which is environmentally friendly, healthy and relatively low-cost, and can reduce white waste pollution. The meals delivery box 83 is of the above-mentioned meals delivery box 83 structure, and has a meals delivery space 831, which can receive the foods put down by the meals transfer device 60. The meals delivery box 83 is fixed on the partition plate 13 and is located in a horizontal side of the bag storage box 81. The meals delivery box 83 is provided directly facing the meals outlet, making it convenient for users to pick up foods through the meals outlet.

In some embodiments, the opening shape of the meals delivery box 83 matches the opening shape of the packaging bag. For example, when the packaging bag is opened into a rectangular parallelepiped space, the shape of the meals delivery box 83 is also a rectangular parallelepiped. The bag pickup piece 85 is movably arranged relative to the fixed seat, that is, it is movably arranged on the partition plate 13, so that it can move back and forth between the bag storage box 81 and the meals delivery box 83 to take out the packaging bags from the bag storage box 81 and put it into the meals delivery box 83. At the same time, the folded packaging bag can also be opened to pack the foods. Specifically, the bag pickup piece 85 can be a robot hand or an adsorption part, etc., which can fix the packaging bag and cooperate with the fixing part in the meals delivery box 83. The two jointly open the opening of the packaging bag, thereby realizing the food falling into the packaging bag.

The packaging device 80 of this structure can realize the storage, transfer and opening of packaging bags, which can well solve the problem of inconvenient carrying of foods or hot foods after heating, and can also solve the problem of inconvenient carrying due to the large variety of food. It is more healthy and hygienic, and improves convenience and safety.

Figure 12:
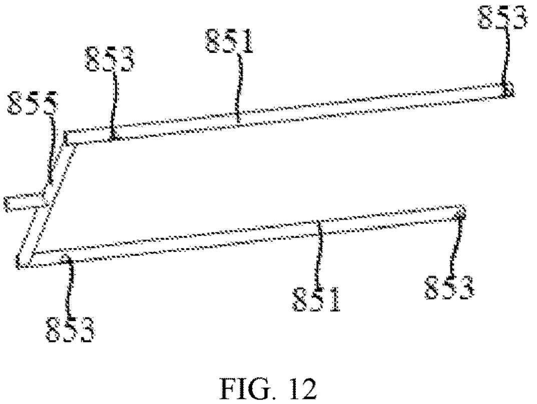
FIG. 12 is a schematic structural view of a support arm and connection arm in the packaging device in FIG. 11.

As shown in FIG. 11 and FIG. 12. In some embodiments, taking the packaging bag as a paper bag as an example, the paper bag has better flatness. In some embodiments, the bag pickup piece 85 includes a supporting arm 851 and a sucker 853 provided on the supporting arm 851. The supporting arm 851 is movably provided relative to the bag storage box 81 and the meals delivery box 83, that is, the supporting arm 851 driven by the driving component can realize up and down movement, left and right movement and front and rear movement, thereby transferring the packaging bags. The sucker 853 is connected to a trachea, and the trachea is connected to a vacuum device (not shown), so that the sucker 853 has vacuum suction and can absorb and fix the packaging bag. The bag pickup piece 85 of this structure does not need to be designed with excessive precision, reduces control difficulty, and can well fix the paper packaging bag, thereby improving the efficiency and success rate of taking the packaging bag.

In some embodiments, in order to improve the stability of the bag pickup piece 85 for absorbing packaging bags, the bag pickup piece 85 also includes two connecting arms 855, and two supporting arms 851 are respectively connected to both ends of the connecting arm 855, thereby increasing the contact zone between the sucker 853 and the packaging bag, effectively improving the adsorption stability. Certainly, a plurality of suckers 853 can be provided on each supporting arm 851 to further enhance the adsorption capacity of the bag pickup piece 85. In soem embodiments, the supporting arm 851 of the bag pickup piece 85 is provided between the bag storage box 81 and the meals delivery box 83. The supporting arm 851 is provided toward the meals delivery box 83, that is, the connecting arm 855 faces the bag storage box 81. The bag pickup piece 85 can move toward the direction of the bag storage box 81, and then move downward, so that the sucker 853 absorbs and fixes the packaging bag, moves upward and away from the bag storage box 81, and then moves toward the meals delivery box 83. Because the opening of the meals delivery box 83 faces upward, in order to reduce the interference between the bag pickup piece 85 and the meals transfer device 60, it is necessary to rotate the meals delivery box 83. The meals delivery box rotates 90 degrees with the central axis perpendicular to the front panel as the axis, that is, rotates 90 degrees counterclockwise. In this way, the opening of the meals delivery box 83 faces the supporting arm 851, the end of the supporting arm 851 can enter the meals delivery space 831, and the supporting arm 851 is rotated 90 degrees around the rotation shaft 84 to make its size consistent with the opening of the meals delivery box 83 to facilitate putting the packaging bag into the meals delivery box 83, which is simple and convenient, and effectively improves the efficiency of transferring packaging bags. After the bag pickup piece 85 is withdrawn from the meals delivery box 83, the meals delivery box 83 is rotated back to the position with the opening facing upward to receive foods.

As shown in FIG. 11, in some embodiments, the packaging device 80 also includes a driving motor 87 and a transmission member 89. In some embodiments, the driving motor 87 can be a motor or other driving component, and the transmission member 89 can be a screw rod or a transmission belt. The driving motor 87 can drive the transmission member 89 to move, and then drive the connecting arm 855 and the supporting arm 851 to move in the vertical and horizontal directions. Certainly the fixing method of the driving motor 87 and the transmission member 89 can be set according to actual needs, so as to ensure the stable operation of the horizontal movement, vertical movement and flipping movement of the supporting arm 851.

As shown in FIG. 11, in some embodiments, in order to facilitate bag taking by the bag pickup piece 85, the bag storage box 81 includes two pairs of oppositely arranged side box plates 811 and a bottom box plate connected to the side box plates 811. A side of the side box plate 811 away from the meals delivery box 83 is provided with an insertion hole 8111, and the insertion hole 8111 is adapted to the size of the supporting arm 851. The insertion hole 8111 extends along the height direction of the side box plate 811. When the bag pickup piece 85 moves to the opening of the bag storage box 81, the connecting arm 855 is located outside the bag storage box 81, and the supporting arm 851 slides downward along the extension direction of the insertion hole 8111 to make the sucker 853 contacts the folded packaging bag. The number of the insertion holes 8111 matches the number of the supporting arms 851, that is, there are two insertion holes 8111. In some embodiments, in order to achieve a better fixing effect, the fixing part provided on the meals delivery box 83 is a sucker 853, and the sucker 853 is connected to a vacuum device. In some embodiments, when the bag pickup piece 85 puts the packaging bag into the meals delivery space 831 and move the packaging bag to the fixed part for absorbing the other surface of the packaging bag away from the bag pickup piece 85. In addition, the bag pickup piece 85 moves in the opposite direction to open the packaging bag by being pulled by the fixed part and the supporting arm 851, and the bag pickup piece 85 moves to the side opposite to the meals delivery box 83. In some embodiments, both sides of the meals delivery box 83 are provided with fixed parts. When the fixed parts are also ventilated to adsorb the packaging the bag, the bag pickup piece 85 can close the ventilation to release the adsorption of the packaging bag, and then withdraw from the meals delivery box 83 and return to the bag waiting state. The fixed part can also be provided with double-sided colloid, which can be gently pulled to separate when the user extracts it.

As shown in FIG. 11, when two opposite sides of the meals delivery box 83 are provided with fixing parts, one side can be formed with a protrusion 833, and the protrusion 833 can be enclosed with the adjacent side to form an avoidance groove 835. When the supporting arm 851 moves to this side, the packaging bag contacts the protrusion 833 and is fixed by the fixing part on the protrusion 833. The supporting arm 851 can be provided in the avoidance groove 835, which is beneficial to the withdrawn of the supporting arm 851, thereby improving transfer efficiency.

As shown in FIG. 10 and FIG. 11, in some embodiments, in order to improve the dining experience, the automatic meals vending machine 100 is also equipped with a tableware storage box 40. The tableware storage box 40 is located on a fixed base and is located close to the meals outlet. There are tableware placed in the tableware storage box 40, and the user can manually press the tableware to take out the tableware when needed, or the tableware can be automatically pushed out for the user to use after taking the food.

Since the opening of the meals delivery box 83 faces upward, in order to facilitate taking food, the meals delivery box 83 can also be set to be rotatable relative to the partition plate 13. The rotation here is relative to the machine shell 10 toward the front panel, so as to enable the opening of the meals delivery box 83 is exposed at the meals outlet, which facilitates the user to directly take out the food and improves the convenience of taking the food. When the food is taken out, the meals delivery box 83 automatically rotates back into the machine shell 10 and can seal the meals outlet to prevent external dust from entering and contaminating the food. A baffle 837 is provided on the surface of the meals delivery box 83 facing the meals outlet. A gap is provided between the baffle 837 and the meals delivery box 83 to facilitate the placement of components that drive the meals delivery box 83 to rotate. The baffle 837 is provided to close the meals outlet, and match the size and shape of the meals outlet. In addition, the baffle 837 can be rotated relative to the machine shell 10 under the driving of the driving component, so that when foods need to be served, the baffle 837 flips toward the outside of the machine shell 10, and drives the meals delivery box 83 to also rotate. In this way, the opening of the meals delivery box 83 is exposed, making it convenient to take foods. The rotation angle can be set here to 30° to 60° to improve convenience.

The automatic meals vending machine 100 can also cooperate with high-tech means such as the Internet, the Internet of Things, and mini-program APPs. By setting a QR code on the machine shell 10 and scanning the code to obtain the ordering mini-program, the selection of foods and payment can be realized.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. A device for storing and retrieving meals applied to an automatic meals vending machine, comprising:

a meals storage shelf; a middle part of the meals storage shelf being provided with a meals pickup passage, the meals storage shelf being provided with a plurality of storage spaces evenly distributed along a circumferential direction and an axial direction, the plurality of storage spaces being provided at a periphery of the meals storage shelf, and the meals pickup passage being communicated with the storage spaces; and a meals pickup assembly comprising a meals storage piece and a meals pushing piece; the meals storage piece being provided in and vertically movable relative to the meals pickup passage, the meals pushing piece being provided at a side of the storage spaces away from the meals pickup passage and being telescopic relative to the meals storage shelf to push meals in a corresponding storage space to the meals storage piece, wherein the meals pickup assembly further comprises a first actuator and two screw rods provided vertically and in parallel;

the first actuator is fixedly provided relative to the meals storage shelf and is configured to drive the two screw rods to rotate synchronously; and the meals storage piece is connected to the two screw rods and is located between the two screw rods to be vertically movable relative to the meals pickup passage.

2. The device for storing and retrieving meals of claim 1, wherein:

the meals pickup assembly further comprises a second actuator and the second actuator is vertically movable relative to the meals storage shelf;

a driving shaft of the second actuator is connected to the meals pushing piece to make the meals pushing piece telescopic; and/or the meals pushing piece is movably provided in a vertical direction; and/or a surface of the meals pushing piece facing the meals storage shelf is a curved surface.

3. The device for storing and retrieving meals of claim 1, wherein:

the meals storage shelf comprises a support bar and at least two storage trays;

the storage trays are provided at intervals in a vertical direction and connected to the support bar; and two adjacent storage trays and the support bar are enclosed to form the storage space.

4. The device for storing and retrieving meals of claim 3, wherein:

each storage tray is provided with a meals pickup hole in a center and a plurality of meals pickup holes in series form the meals pickup passage;

a plurality of support bars are provided at a periphery of the storage trays at intervals and configured to extend towards a center of the storage trays; and two adjacent support bars and two adjacent storage trays are enclosed to form the storage space.

5. The device for storing and retrieving meals of claim 1, wherein:

the meals pickup assembly comprises a puncher fixed above the meals storage piece; and the puncher is provided with a needle towards a surface of the meals storage piece to punch a hole on a packaging box in the meals storage piece.

6. An automatic meals vending machine, comprising:

a machine shell provided with an accommodation space and a meals outlet communicated to the accommodation space;

the device for storing and retrieving meals of claim 1 provided inside the accommodation space;

an electronic control assembly provided in the accommodation space and electrically connected to the device for storing and retrieving meals to control the device for storing and retrieving meals to take out meals and deliver the meals to the meals outlet; and a heating assembly, wherein the meals pickup assembly is movable between the meals storage shelf and the heating assembly to take out meals in the storage space, send the meals to the heating assembly for heating, and delivery the meals to the meals outlet; and wherein:

the machine shell comprises an outer shell and at least two partition plates;

the outer shell is configured to form the accommodation space, and the partition plates are connected to an inner wall of the accommodation space to divide the accommodation space into a heating zone, a cold storage zone, an electronic control zone from top to bottom;

the heating assembly is provided in the heating zone, the meals storage shelf is provided in the cold storage zone, and the electronic control assembly is provided in the electronic control zone; and/or the automatic meals vending machine further comprises a meals transfer device provided between the heating assembly and the meals outlet to transfer the meals to the meals outlet; and/or the automatic meals vending machine further comprises a packaging device provided between the heating assembly and the meals outlet to pack up heated meals; and/or a heating method of the heating assembly comprises at least one of roasting heating, water bath heating, steam heating, microwave and/or light wave heating.

7. The automatic meals vending machine of claim 6, wherein:

the meals storage shelf is rotatably provided relative to the machine shell; and/or a plurality of devices for storing and retrieving meals are provided side by side in the accommodation space at intervals.

* * * * *